United States Patent [19]
Hughes

[11] 3,794,109
[45] Feb. 26, 1974

[54] ROTARY HEAT EXCHANGERS

[75] Inventor: John Oliver Philip Hughes, Princes Risborough, England

[73] Assignee: British Leyland Truck and Bus Division Limited, Leyland, Lancashire, England

[22] Filed: May 15, 1972

[21] Appl. No.: 253,193

[30] Foreign Application Priority Data
June 11, 1971  Great Britain.................. 27612/71

[52] U.S. Cl........................ 165/8, 165/10, 64/27 C, 74/443, 74/446
[51] Int. Cl.............................................. F28d 19/00
[58] Field of Search...165/8, 9, 10; 64/27 C; 74/443, 74/446, 447

[56] References Cited
UNITED STATES PATENTS

| | | | |
|---|---|---|---|
| 3,496,993 | 2/1970 | Azelborn | 165/8 |
| 603,865 | 5/1898 | Whitaker | 64/27 C X |
| 1,256,526 | 2/1918 | Deisenhofer | 64/27 C X |
| 3,586,096 | 6/1971 | McLean | 165/8 |

Primary Examiner—Albert W. Davis, Jr.
Attorney, Agent, or Firm—Joseph F. Brisebois

[57] ABSTRACT

A heat-exchanger of the kind having a rotary disc-type matrix that comprises a foraminous core of ceramic material arranged to effect heat transference between segregated streams of gaseous heat-exchanging fluids; has an annular gap between the periphery of the ceramic disc of the rotary matrix and a surrounding co-axial metallic drive-ring; the annular gap containing radially-disposed compression springs spaced around the periphery of the disc and serving to transmit drive from the drive-ring to the ceramic disc.

4 Claims, 1 Drawing Figure

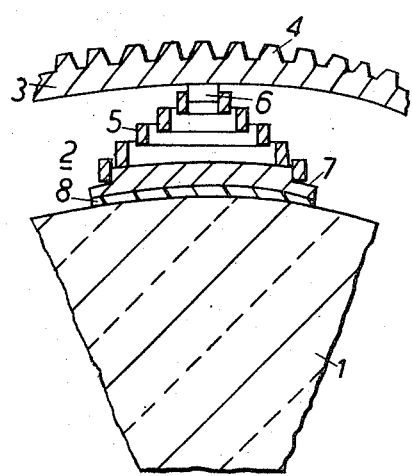

ROTARY HEAT EXCHANGERS

This invention relates to heat-exchangers of the kind having a rotary disc-type matrix that comprises a foraminous core of ceramic material which is arranged to effect heat transference between segregated streams of gaseous heat-exchanging fluids.

Heat-exchangers of the kind referred to are commonly employed in gas turbine power plants, to extract heat from the exhaust gases and to transfer it to the compressed intake-air before this enters the combustion chamber of the gas turbine engine. The drive to the ceramic disc of the rotary matrix is normally imparted by drive-transmitting members spaced around the periphery of the disc, and located in an annular gap between that periphery and a surrounding coaxial metallic ring gear which is driven by a pinion.

The above-mentioned drive-transmitting members are usually endowed with radial flexibility, in order to accommodate the thermal expansion of the metallic drive-ring relative to the ceramic disc. But the brittle nature of ceramic material imposes an additional requirement which (so far as we are aware) is not fulfilled by any of the known drive-transmitting members; namely, for the driving torque to be distributed uniformly around the periphery of the disc.

According to this invention a heat-exchanger of the kind specified above has each of the following features:
a. there is an annular gap between the periphery of the ceramic disc of the rotary matrix and a surrounding coaxial metallic drive-ring;
b. the annular gap contains compression springs spaced around the periphery of the disc and having radially disposed axes;
c. each of the springs has one end held in engagement with the drive-ring, and has its other end seated on a metallic drive-plate; and
d. each drive-plate rests on, or is bonded to, its own underlying elastomeric pad, which is held against the periphery of the ceramic disc by the thrust of the corresponding spring or springs.

The arrangement is such that the rate of the springs in a circumferential direction around the disc-type matrix is designed to distribute the driving torque uniformly. Similarly, the radial rate of the springs is made sufficient to transmit the driving torque uniformly without slip between the elastomeric pads and the ceramic disc; whilst tolerating distortion due to gear loads, cyclic loads due to seal friction, and dimensional inaccuracies in addition to thermal expansion of the drive-ring.

The required combination of circumferential and radial rates can be achieved by a variety of spring arrangements, but we prefer to employ spiral springs of cone-like shape; the smaller end of each spring being located, and held, by a corresponding dowel fixed to, and projecting radially inwards from, the drive-ring.

The invention is exemplified by the accompanying drawing, which shows the preferred drive-transmitting means as a fragmentary section in a plane at right angles to the axis of rotation of the matrix of the heat-exchanger. The rotary matrix is a ceramic disc 1, and an annular gap 2 exists between the periphery of this disc and a surrounding coaxial metallic drive-ring 3, which has external teeth 4 engageable by a pinion or other driving means (not shown).

The annular gap 2 contains spiral compression springs 5 of cone-like shape, spaced around the periphery of the disc 1 with their axes disposed radially to the disc. Each of the springs 5 (of which only one is shown) has its smaller end located, and held, by a corresponding dowel 6 fixed to, and projecting radially inwards from, the drive-ring 3. The larger end of each of the springs 5 is seated on a metallic drive-plate 7 (only one such plate being shown).

Each drive-plate 7 rests on, or is bonded to, its own underlying elastomeric pad 8, which is held against the periphery of the disc 1 by the thrust of the corresponding spring (or springs, if each drive-plate 7 is arranged to accommodate more than one spring).

The metal drive-plates 7 and their associated elastomeric pads 8 are shaped to conform to the radius of curvature of the ceramic disc 1.

I claim:
1. In a heat-exchanger of the kind having a rotary disc-type matrix that comprises a foraminous core of ceramic material arranged to effect heat transference between segregated streams of gaseous heat-exchanging fluids, said core being surrounded by a coaxial metallic drive-ring which defines an annular gap between said drive-ring and core, the improvement which comprises:
a. a plurality of volute compression springs spaced about the periphery of said core, said springs having radially extending axes and their smaller ends outermost;
b. projecting means connected to the internal periphery of said metallic drive-ring and located in the smaller outermost end of each spring to transmit drive from said drive-ring to each said spring;
c. a plurality of metallic drive plates for said springs on which innermost ends of said springs are seated; and
d. an elastomeric pad interposed between each said metallic drive plate and the outer periphery of said core, each said spring urging its associated metallic drive plate and elastomeric pad against the outer periphery of said core to transmit drive from said metallic drive-ring through said spring, drive plate and elastomeric pad to said core.

2. A heat-exchanger as claimed in claim 1 in which each said projecting means comprises a dowel which is secured to and projects radially inwardly from the drive-ring.

3. A heat-exchanger as claimed in claim 1 including means bonding each drive-plate to its associated elastomeric pad.

4. A heat-exchanger as claimed in claim 1 in which a plurality of said springs have a single drive-plate and a single elastomeric pad associated with them.

* * * * *